United States Patent [19]

Snoek

[11] 4,271,862
[45] Jun. 9, 1981

[54] CHECK VALVE AND METHOD OF MANUFACTURING SAID CHECK VALVE

[75] Inventor: Govert J. Snoek, Velp, Netherlands

[73] Assignee: Inter Ocean N.V., Curacao, Netherlands

[21] Appl. No.: 37,040

[22] Filed: May 8, 1979

[30] Foreign Application Priority Data

May 8, 1978 [NL] Netherlands .......................... 7804923

[51] Int. Cl.³ ............................................. F16K 15/06
[52] U.S. Cl. .................................. 137/511; 251/362; 251/363; 137/542
[58] Field of Search ................ 137/542; 251/360, 361, 251/362, DIG. 1, 363

[56] References Cited

U.S. PATENT DOCUMENTS

| 2,409,220 | 10/1941 | Melichar et al. | 251/362 |
| 2,574,054 | 11/1951 | Miller | 251/362 |
| 2,673,062 | 3/1954 | Cornelius | 251/361 |
| 2,909,192 | 10/1959 | Dobride | 137/542 |
| 3,022,978 | 2/1962 | Kowalski et al. | 251/362 |
| 3,051,196 | 8/1962 | Miller | 251/360 |
| 3,051,435 | 8/1962 | Ramsey | 251/362 |
| 3,181,834 | 5/1965 | Jennings et al. | 251/62 |
| 3,358,964 | 12/1967 | Cohen et al. | 251/362 |
| 3,471,123 | 10/1969 | Carlson et al. | 251/362 |
| 3,604,682 | 9/1971 | Richards | 251/362 |

FOREIGN PATENT DOCUMENTS 2534316  2/1976  Fed. Rep. of Germany .......... 251/312

Primary Examiner—Martin P. Schwadron
Assistant Examiner—A. Michael Chambers
Attorney, Agent, or Firm—John P. Snyder

[57] ABSTRACT

A check valve having a predominantly cylindrical housing, a sealing diaphragm comprising a thin, tubular slip and at one extremity a radially outwardly extending fastening flange, said flange being clamped between an uninterrupted inner shoulder in the housing and an annular locking member of a synthetic resin, having an outer surface being at least partly tapering, said locking member being enclosed between the fastening flange and an inwardly projecting protuberance of the housing, and a rotation symmetrical closing member being axially displaceable between a closing position sealing on the slip and an opened position away from said slip.

When assembling the component parts of this check valve the diaphragm is first installed and thereafter the locking member is forced in position by an axial movement only.

4 Claims, 4 Drawing Figures

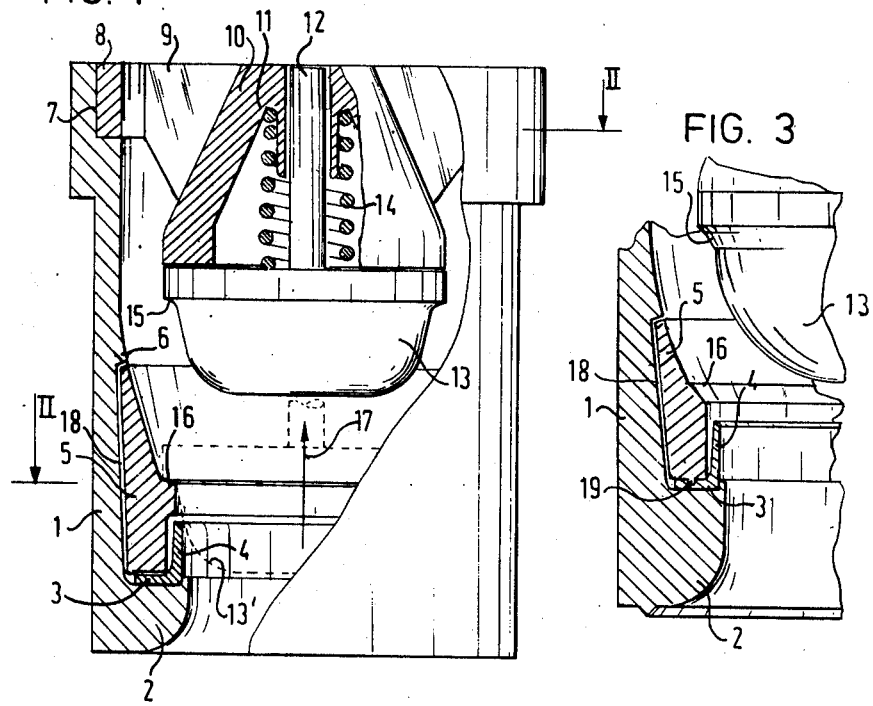
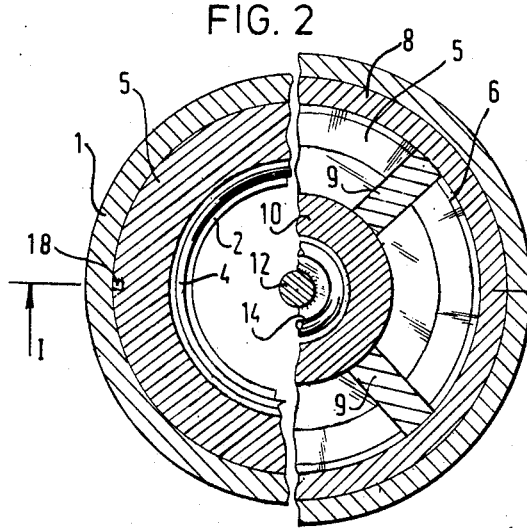
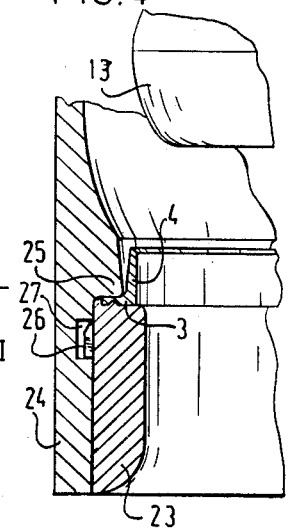

CHECK VALVE AND METHOD OF MANUFACTURING SAID CHECK VALVE

The invention relates to a check valve comprising a substantially cylindrical housing, a diaphragm comprising a radially outwardly projecting fastening flange and a thin, substantially cylindrical slip, the flange being between an uninterrupted inner shoulder in the housing and an annular locking member of a synthetic resin and a rotation-symmetrical closing member, which is axially displaceable between a position in which it bears on the slip and a position removed therefrom.

Such a check value is generally known and is usually provided with a locking member having screwthread fitting to correspond thread of the housing. Despite the interposition of a gland or washer between the locking member and the fastening flange of the diaphragm the latter is often found to be deformed during tightening due to the torque exerted thereon. For fear of this deformation the locking member is sometimes insufficiently tightened, which may result in insufficient sealing.

The invention has for its object to provide a simple, but effective solution of this problem. The check valve of the kind set forth in the preamble is constructed to this end so that the locking member has an at least partly tapering outer surface and is locked in between the fastening flange of the diaphragm bearing on the shoulder and an inwardly directed protuberance of the housing.

This locking member is pressed into the housing by a solely axial movement whilst said member and/or the housing are temporarily deformed in a radial direction.

In order to resist with optimum reliability the pressure of the return flow of medium, when the check valve is closed, the locking member is preferably inserted from the outlet side into the housing before the closing member is disposed in the housing.

For this purpose the locking member is located on the side of the diaphragm facing the closing member and is provided with an inwardly extending shoulder engaged by an outwardly extending shoulder of the closing member when it is in contact with the slip of the diaphragm.

In an advantageous embodiment the locking member has the form of a ring having an at least partly tapering outer side fitting in a corresponding recess in the inner wall of the housing. The taper is determined by the extension in the housing through which the ring has to be urged by force: the smallest diameter of the tapering portion must not exceed the smallest diameter of the housing at the area of said extension.

In the partly tapering outer surface of the locking member preferably a channel is provided between the two axial ends in order to exclude an inward pressure on the fastening flange by the fluid during opening movement of the closing member.

In order to limit the resistance immediately at the restoration of the normal direction of flow of the fluid when the check valve is opened, it is advisable to maintain a clearly distinguishable passage way between the uninterrupted inner shoulder and the closing member in the closing position thereof.

In oder to firmly fasten the diaphragm in sealing relationship the surface of the locking member facing the fastening flange thereof is preferably provided with an uninterrupted circular ridge or an uninterrupted circular groove. If necessary, said flange has a matching surface, in which case the term "matching" has a fairly broad meaning, due to the deformability of the flange.

The invention will be described more fully hereinafter with reference to a few preferred embodiments illustrated in the drawing.

FIG. 1 is an elevational view and a partly axial sectional view of a check valve in accordance with the invention.

FIG. 2 is a radial sectional view taken on the line II—II in FIG. 1.

FIGS. 3 and 4 are partly axial sectional views of a few modified embodiments.

FIGS. 1 and 2 show a check valve comprising a substantially cylindrical housing 1 having a uninterrupted, inwardly projecting shoulder 2, supporting a radially outwardly extending fastening flange 3 of a diaphragm of rubber-elastic material having a thin, cylindrical slip 4. The flange 3 is clamped tight to the shoulder 2 by the locking ring 5, which is enclosed in a correspondingly shaped recess in the inner wall of the housing 1 between the flange 3 engaging the shoulder 2 and the inwardly projecting protuberance 6 of the housing. In the embodiment shown this inwardly projecting protuberance extends annularly along the whole inner wall of the housing, though a number of discrete protuberances may be used as an alternative.

The locking ring 5 has a tapering outer side so that it can be readily inserted by the narrower end into the portion of the housing narrowed by the inward protuberance 6, after which it can be urged beyond this protuberance by an axial force, the previously inserted diaphragm being thus clamped by its fastening flange 3. The shape of the recess for the locking ring in the inner surface of the housing corresponds at least partly with the outer surface of said ring. The tapering outer side of the locking ring 5 has at least one axially extending channel 18 so that, when the check valve is opened, it prevents that on the outer side of the fastening flange 3 of the diaphragm a higher fluid pressure should remain than on the inner side.

In order to enhance the flow characteristics the inner surface of the housing and the ring preferably join one another smoothly.

At the outflow end of the check valve the housing has a groove 7 receiving a ring 8 having four inwardly extending ribs 9. At the inner end said ribs hold a conical body 10 having a central bore 11. This bore receives a stem 12 of a closing body 13 operating as a valve member. Between the conical body 10 and the closing body 13 a compression spring 14 is loading the closing body 13 towards the diaphragm 3,4.

The check valve is illustrated in the open state, but it closes under the action of the compression spring before the normal stream ceases: in this case the closing body occupies the position 13', indicating by broken lines, slightly redially widening the slip 4.

In the closed state the closing body 13 bears by an outer shoulder 15 on a corresponding inner shoulder 16 of the locking ring 5 so that the flange 3 is clamped more tightly and cannot be displaced by forces exerted on the slip 4. Additionally in this way the seal in the area of the flange 3 is improved.

The mutually facing surfaces of the outer shoulder 15 on the closing body 13 and of the inner shoulder 16 on the locking ring 5 have such a shape that they can engage in a co-planar manner, whilst each of them preferably described a part of a conical plane around the centre line of the valve having a vertex between 120° and 180°. If this vertex is larger, an unfavourable flow will occur in the opened valve and if it is smaller, jamming may occur.

In order to ensure that upon the return of the normal direction of flow indicated by the arrow 17 the resistance remains limited when the check valve is opened, the closing body 13 should not be in contact with the uninterrupted inner shoulder 2, on the contrary there should be maintained an uninterrupted annular channel between said two parts.

FIG. 3 shows a modified embodiment: the locking ring 5 is provided on the side facing the fastening flange 3 with an uninterrupted annular ridge 19, which fits in an uninterrupted groove in the fastening flange 3 of the diaphragm. As a matter of course, a ridge may conversely be provided on the flange 3 and a groove in the ring 5.

FIG. 4 shows an embodiment in which the locking ring 23 is inserted into the housing 24 from the inflow side, thus clamping the fastening flange 3 of the diaphragm against the inner shoulder 25. The ring 23 is fastened by a few partly tapering, outwardly projecting protuberances 26 of the ring, engaging an inner groove 27 of the housing. This embodiment has the advantage of a slightly simpler mounting operation, but a disadvantage in that the closing forces are less favourably absorbed than in the embodiments described hereinbefore.

What I claim is:

1. In a check valve assembly, in combination:
a valve housing having a bore therethrough and having an uninterrupted integral shoulder projecting inwardly of said bore, said shoulder presenting an annular seating surface and said housing also having an integral reaction surface extending radially outwardly with respect to said bore and facing in the direction of said seating surface but spaced therefrom;
a diaphragm comprising a substantially cylindrical skirt presenting a sealing mouth at one end thereof and having a radially outwardly projecting flange spaced from said sealing mouth, said flange being engaged on said seating surface and said diaphragm being formed of thin, elastic material whereby said sealing mouth may receive and be expanded by a check valve body to effect sealing engagement therewith while, at the same time, the diaphragm is propense to unwanted deformations if rotational clamping of its flange against said seating surface is used with sufficient force as to effect sealing thereat; and
means for clamping said flange against said seating surface without imparting rotational clamping of said flange to effect a seal between said flange and said seating surface so as to avoid said unwanted deformations of said diaphragm, said means comprising a generally cylindrical member having an end face at one end thereof adapted to bear against said flange and hold it in sealing contact with said seating surface, said member having a locking surface facing away from said one end of the member and engaging said reaction surface of said valve housing and being spaced from said one end of the member by a predetermined amount which causes said flange to be sealingly clamped between said end face of the member and said seating surface of the valve housing when said locking surface is seated against said reaction surface, said valve housing being of lesser bore diameter at said reaction surface that is said cylindrical member at said locking surface whereby said locking surface cannot engage with said reaction surface without radial deforation of one of the housing and said cylindrical member prior to such engagement, and at least one of said valve housing and said member being formed of material allowing such deformation, and said cylindrical member having a tapering surface between said one end thereof and said locking surface to facilitate the deformation necessary to allow axial insertion of said member into locked engagement within said valve housing.

2. In a check valve as defined in claim 1 wherein said seating surface faces said valve body and said cylindrical member is provided with a similarly facing surface against which said valve body engages when the valve body enters and expands said sealing mouth of the diaphragm, whereby said cylindrical member is urged toward said seating surface by the valve body to enhance the clamping of said flange.

3. In a check valve assembly as defined in claim 1 wherein said seating surface faces away from said valve body and said cylindrical member is provided with a plurality of protruberances which provide said locking surface, said protruberances being bevelled to provide said tapering surface.

4. In a check valve assembly as defined in any one of claims 1-3 wherein said end face of the cylindrical member is provided with an annular ridge and said flange of the diaphragm is provided with an annular groove receiving said ridge.

* * * * *